United States Patent
Gass

(10) Patent No.: US 7,086,143 B2
(45) Date of Patent: Aug. 8, 2006

(54) MACHINING SYSTEM AND TOOL UNIT FOR THE MACHINING OF WORKPIECES

(75) Inventor: Baltes Gass, Aalen (DE)

(73) Assignee: Alfing Montagetechnik GmbH, Aalen (DE)

(*) Notice: Subject to any disclaimer, the term of this patent is extended or adjusted under 35 U.S.C. 154(b) by 29 days.

(21) Appl. No.: 10/614,824

(22) Filed: Jul. 9, 2003

(65) Prior Publication Data

US 2004/0211051 A1 Oct. 28, 2004

Related U.S. Application Data

(63) Continuation of application No. PCT/EP02/00292, filed on Jan. 14, 2002.

(30) Foreign Application Priority Data

Jan. 12, 2001 (DE) ................. 101 01 310

(51) Int. Cl.
 B23P 21/00 (2006.01)
(52) U.S. Cl. .......................... 29/714; 29/709
(58) Field of Classification Search ................. 29/714, 29/700, 707, 709, 711, 712, 720, 721, 722, 29/730, 750, 751, 752; 198/341.09, 341.05; 324/378, 500, 503; 901/7
See application file for complete search history.

(56) References Cited

U.S. PATENT DOCUMENTS

| | | | |
|---|---|---|---|
| 4,453,303 A | 6/1984 | Leddet | |
| 5,207,309 A | 5/1993 | Jones et al. | |
| 5,321,619 A | 6/1994 | Matsuda | |
| 5,857,814 A | 1/1999 | Jang | |
| 2002/0038159 A1 | 3/2002 | Gass | |

FOREIGN PATENT DOCUMENTS

| | | |
|---|---|---|
| DE | 36 27 706 C2 | 3/1988 |
| DE | 40 21 330 A | 1/1992 |
| DE | 196 44 694 A1 | 5/1997 |
| DE | 198 43 162 A1 | 4/2000 |
| EP | 0 825 502 A | 2/1998 |

OTHER PUBLICATIONS

O. V. Dugern, et al.: "Eine Madulare Grundsteuerung Fur Flexible Montagezellen" Automatisierungstechnische Praxis—ATP, Oldenbourg Verlag, Munchen, DE, vol. 32, NR. 1, pp. 22-29, XP000126014, ISSN : 0178-2320.

*Primary Examiner*—John C. Hong
(74) *Attorney, Agent, or Firm*—Sughrue Mion, PLLC

(57) ABSTRACT

A machining system (SYS) for carrying out manufacturing in assembly lines is provided with individual tool units (WE1, WE2, ..., WEn) that each include a holding device (3-1, 3-2, ..., 3-n). The individual tool units (WE1, WE2, ..., WEn) also comprise a position determination device (PBE1, PBE2, ..., PBn) that determines the position of the tool unit along a retaining rail (4), in which the tool units are suspended. A control unit (ST1, ST2, ..., STn) adjusts machining parameter sets according to the position of the tool units detected in the aforementioned manner. The retaining rail (4) is preferably provided in the form of a retaining rail, in which a conductor rail (11) and a data rail (10) are integrated whereby rendering trailing of the cable unnessary for conducting data communications and for supplying power. This configuration of tool units enables an easy and user-friendly execution of a simple reverse clocking and a simple expansion of the machining system with additional machining sections (BA1, BA2, ..., Ban) and additional tool units (WE1, WE2, ..., WEn).

30 Claims, 4 Drawing Sheets

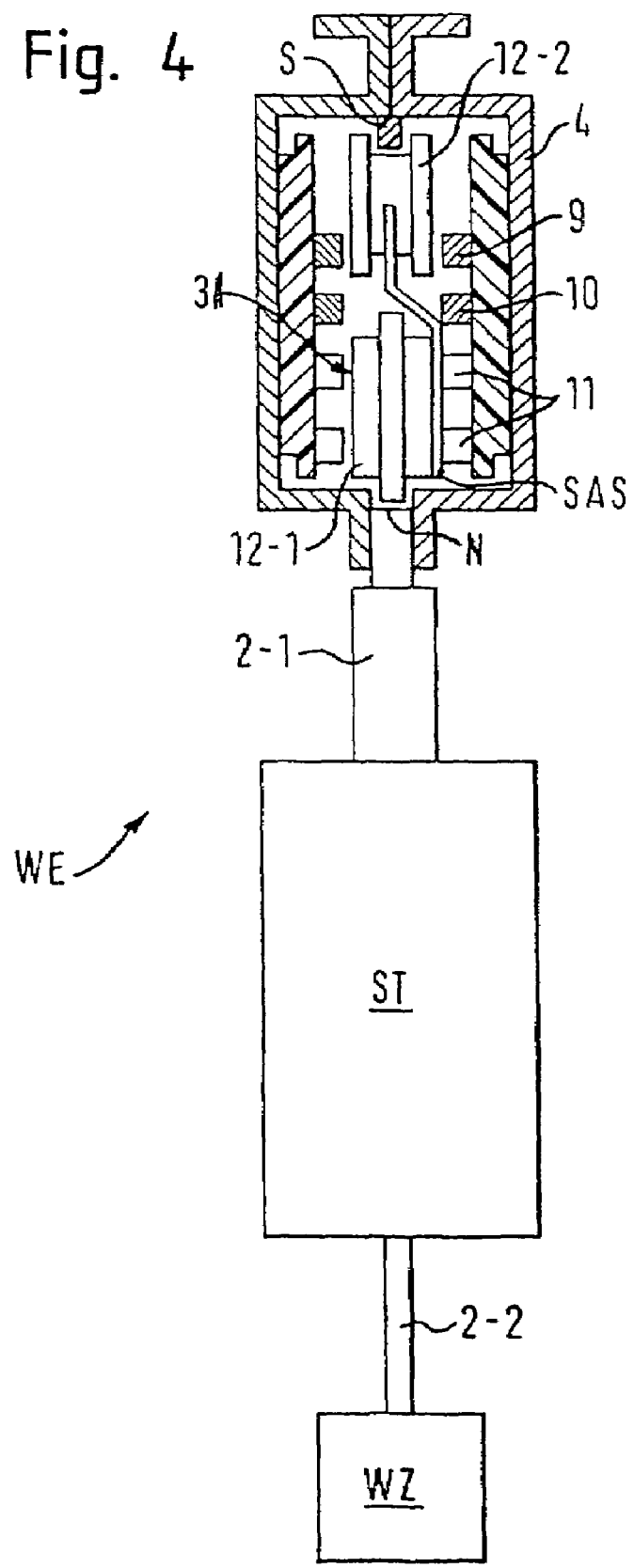

MACHINING SYSTEM AND TOOL UNIT FOR THE MACHINING OF WORKPIECES

This is a continuation of application Ser. No. PCT/EP02/00292 filed Jan. 14, 2002; the above noted prior applications are all hereby incorporated by reference.

FIELD OF THE INVENTION

The invention concerns a machining system for the machining of workpieces, in particular of workpieces located on a production line, and a tool unit for the machining of a workpiece with an electrically controlled machining tool. The invention particularly concerns a machining system and a tool unit having the features of the first portion of claim 1 and claim 21 respectively.

Such a machining system and such a tool unit are typically used in assembly technology, particularly in automotive production. However, such a machining system and such a tool unit are also found in other areas of application in which a number of individual assembly steps are performed one after another at various positions during the assembly of a product, for example in the mass production of hi-fi systems, etc.

There is conventionally a relative fixed assignment of machining tools to the assembly sections or machining zones, which means that problems arise if for example a new machining step is added, requiring a new tool to be introduced into the sequential machining process. Problems equally arise if only the machining sequence of the individual machining steps is to be changed. With conventional machining tools that operate in a trailing cable installation, this is either impossible or very difficult, and the invention relates in particular to a machining system and a machining tool that can eliminate this problem.

The problems mentioned above are explained below in more detail in connection with the attached figures.

BACKGROUND OF THE INVENTION

As FIG. 1 shows, the conventional practice in assembly technology is currently to connect a machining tool, in particular a hand-operated electrically controllable machining tool such as a single screwdriver or a multiple screwdriver 1 via a connecting rod 2 to a holding unit 3, which is held in a sliding support mechanism 4 such that the holding unit 3 is able to move by sliding in the sliding support mechanism 4. The holding unit 3 is conventionally a travelling box or trolley provided with a number of rollers, which are suspended in a roller rail having a U-shaped profile, for example, which is used as the sliding support mechanism 4.

As the diagrammatic view in FIG. 1 shows, the machining tool 1 naturally needs to be supplied with power, for which purpose a trailing cable installation $3_1$, $3_2$, $3_3$ ... $3_n$ is used. The cable 5 for the power supply, which is inherently disruptive to the machining process, is typically suspended from cable hanger units $3_1$, $3_2$, $3_3$ ... $3_n$, which are likewise held in the roller rail 4. Reference number 6 in FIG. 1 indicates an end fixing device for the cable 5 before it passes to a control unit STE for the machining tool. The trailing cable installation includes not only the power supply lines but also control lines and data lines, as the control unit STE sets the machining tool to predefined machining parameters in order to execute a predefined machining process and in some circumstances feedback also has to be passed from the machining tool 1 to the control unit STE, for example information about the final torque obtained on tightened screws.

Furthermore, the roller rail 4 is not restricted to a purely straight configuration as shown in FIG. 1, of course, but curved designs are also conceivable, such that the machining tool can also move in a curved path along the roller rail 4. Of course, in an assembly line not just one single machining tool, as shown in FIG. 1, is needed; instead, several machining tools 1-1, 1-2 are typically suspended in sections BA1, BA2 in a roller rail 4, as shown in FIG. 2a. Reference number 8 in FIG. 2a indicates a moving belt, WST1, WST2 indicate workpieces, for example vehicles, which move at a preset speed v from one machining zone BA1 to another machining zone BA2, reference numbers 3-1, 3-2 indicate the holding units (trolleys) already shown in FIG. 1 and reference numbers 5-1, 5-2 indicate the cable between the machining tools 1-1, 1-2 and the individual control units ST1, ST2.

As FIG. 2a shows, the entire assembly process is divided into machining sections or machining zones BA1, BA2, whereby each machining tool 1-1, 1-2 can only move along the rail 4 in the machining zone assigned to it. Out-of-range sensors are therefore provided for a minimum warning limit 7-1 and a maximum warning limit 7-2 or 7-4 and 7-3 such that an alarm is issued if the tools leave the zones. It is also possible to provide sensors that cause the production belt 8 to stop in the event of a major range violation. The control units ST1, ST2 can also be jointly controlled from a central processing system ZV, via radio or infrared or via cable, for example.

For example, a door is fitted in a machining zone BA1 in FIG. 2a, such that the control unit ST1 sets the tool 1-1, WZ1 to predefined parameters for fixing screws on the doors. In machining zone BA2, for example, a boot lid is fitted with tool 1-2, WZ2, such that the control unit ST2 sets the machining tool 1-2, WZ2 to corresponding parameters. In automotive technology the length of the individual machining sections can be 6 m to 12 m, for example.

A fundamental problem of such a machining system SYS of the prior art can already be recognised from FIG. 2a. As the trailing cable installation 5-1, 5-2 likewise has to be suspended from trolleys in the rail 4, the entire cable harness has to be moved to and fro when operating the individual tool, which is very inconvenient for the operator. Moreover, if an additional machining tool is to be introduced, for example if machining section 2 is to be split into two further subsections, all the trolleys in the trailing cable installation and in the support mechanism have to be switched, which is extremely laborious. In some circumstances it is also necessary to reverse the left-right arrangement of tool and control unit, such that for this reason too the entire trailing cable along with the holding units 3-1, 3-2 may need to be removed from the roller rail 4. Furthermore, the limit switches, i.e. the out-of-range sensors 7-1 ... 7-4 on the roller rail have to be set up again. In addition, each machining tool requires its own cable harness. Alternatively, if a flexible use of tools and a flexible changeover of tools is to be provided, a new rail would have to be set up in parallel, with new tools.

The addition of new tools or of new machining sections or machining zones is generally known as "rephasing" the assembly line. This is explained in more detail in FIG. 2. The entire assembly line is divided into a number of machining sections BA1 ... BA6, whereby in each machining section a defined machining process is to be performed, for example screwing on the door, seat, window, bonnet, wheels, etc.

Two or even more machining tools 1-1, 1-2 are typically provided for each machining section BA1 ... BA6, which means that the arrangement in FIG. 2a may be found in every machining zone illustrated in FIG. 2b.

If by way of example the sequence of steps BA1 ... BA6 is to be changed, for example such that the bonnet is to be fitted before the window, the sequence for BA4 must be switched with BA3. This is known as rephasing the machining system SYS. As explained above, this requires the tool with its holding unit and the entire trailing cable to be switched, which is extremely laborious.

If a new phase is to be introduced, for example the fixing of a battery in machining step BA4' between the fixing of the bonnet and the wheels in machining steps BA4, BA5, all the suspended cables must be shunted sideways or a new rail introduced in an additional phase. The out-of-range sensors also have to be set up again in turn. Rephasing and extending an assembly line is therefore extremely time-consuming and the trailing cable is inconvenient for the operator.

SUMMARY OF THE INVENTION

As has already been explained above by reference to FIG. 1 and to FIGS. 2a and 2b, there is no easy way to rephase or extend the assembly line in the prior art, substantially because the individual tool units have a relatively fixed mechanical assignment to the individual machining sections and cannot easily be switched.

The object of the invention is to provide a machining system and a tool unit that allow a simple rephasing or extension of an assembly line with tool units in a simple and user-friendly way.

This object is achieved by a machining system (claim 1) for the machining of workpieces, in particular of workpieces located on a production line, comprising: a large number of tool units, each with an electrically controllable machining tool and a holding unit; a sliding support mechanism in which the holding units are held in sequence, whereby the holding units are held in the sliding mechanism in such a way that they can slide; and a large number of control units for setting an individual machining tool to a set of predefined machining parameters in order to execute a predefined machining process; whereby each tool unit includes a position determining unit, which determines the position of the individual tool unit along the sliding support mechanism; the control unit is part of the tool unit; and the control unit sets the individual machining tool to a particular set of machining parameters according to the position of the tool unit determined by the position determining unit.

This object is also achieved by a tool unit (claim 21) in a machining system for the machining of workpieces, in particular of workpieces located on a production line, comprising an electrically controllable machining tool; and a holding unit to be held in a sliding support mechanism in the machining system; whereby a control unit is provided for setting the machining tool to a set of predefined machining parameters in order to execute a predefined machining process; each tool unit includes a position determining unit, which determines the position of the individual tool unit along the sliding support mechanism; and the control unit sets the individual machining tool to a particular set of machining parameters according to the position of the tool unit determined by the position determining unit.

According to the invention tool units are suspended in the sliding support mechanism by means of their individual holding unit, whereby each tool unit can determine its position along the sliding support mechanism independently.

A control unit, which is part of this suspendable tool unit, works directly with the position determining unit and sets the machining tool to specific machining parameters according to its position. Thus if the line is rephased, different parameter sets simply need to be defined in the individual control unit for the tool unit. If the line is extended, only the assignment of the machining parameter set and the position range need to be reset.

Advantageous Embodiments

In the individual control units a large number of machining parameter sets are advantageously (claim 2, 22) assigned to specific position ranges, such that a different machining task can be assigned simply by moving the individual tool unit.

A central processing unit (claim 4) can be provided to reconfigure the machining parameter sets and/or the position ranges in the individual control units for the tool units if a new tool unit is added. This enables the entire system to be rephased centrally without having to switch the tool units.

Although the tool units can be provided with a conventional trailing cable to supply power to the control units, a further embodiment of the machining system (claim 5) includes a power supply system to supply power to the individual control units, whereby the power supply system is part of the sliding support mechanism and the sliding support mechanism and the holding units are designed in such a way that electrical power is at least supplied to the control unit for the tool units, regardless of the position of the tool unit. This means that power is preferably supplied via the sliding support mechanism such that a trailing cable in the conventional sense is not required.

The sliding support mechanism is preferably a roller rail and the holding unit for the individual tool unit is a travelling box (claim 6) suspended in the holding rail, whereby a current conductor is integrated into the roller rail and the travelling boxes include a current collecting device to take current from the current conductor and supply it to the individual control unit (claim 7, 23, 24). In this way each tool unit is completely independent from any cables and in particular is independent from the supply of power via cable.

It is also advantageous to build an integrated data line or integrated data bus into the roller rail (claim 18), whereby the individual travelling box for the tool unit includes a data receiving device to receive data from the data bus and to supply it to the individual control unit for the tool unit. In this way bidirectional data communication can be established between the individual control units and the central processing unit without the need for any cables.

However, it is also possible (claim 17) to establish data communication between the control units and the central processing unit by means of a radio interface or an infrared interface. It is also possible to use data signals for data communication between the central processing unit and the control unit via communication signals, which are modulated to the busbar (claim 19).

It is also advantageous for the control unit to include an alarm system that issues an alarm if the control unit determines from the position determined by the position determining device that a position range violation has occurred (claim 29, 30).

The position determining device preferably determines the relative distance to a reference point along the sliding support mechanism (claim 8, 25).

If the roller rail or part of the roller rail is formed from a conductive material, for example a conductive plastic, the individual position determining device can determine the position from the start of the rail as a reference point by measuring the voltage drop (claim 9, 26).

In addition, a resistance measuring strip can also be integrated into the roller rail so that only the resistance along the busbar has to be measured (claim 10, 26). It is also possible for the position determining device to determine the position relative to a specified reference point, for example the start of the rail, by means of a laser distance measurement (claim 11, 27).

The machining system can also include a workpiece position determining device to determine the position of the individual workpieces on the production line (claim 12). The workpiece position determining device can include a workpiece speed detection device (claim 13) to enable the position of a workpiece to be determined.

It is also possible for the central processing system to supply power to the power supply system on the sliding support mechanism (claim 14), whereby either the central processing system or each tool unit can include a voltage transformer (claim 15, 16). With the latter embodiment a predefined voltage is supplied to each control unit, which then converts the voltage to the voltage required for the individual machining tool.

Other advantageous embodiments of and improvements to the invention are cited in the subordinate claims. It should also be noted that the invention also includes other embodiments deriving from a combination of features, which are listed separately in the claims and/or in the description of the figures.

The invention is explained in greater detail below by means of its advantageous embodiments with reference to the drawings.

BRIEF DESCRIPTION OF THE DRAWINGS

In the drawings identical or similar reference numbers indicate identical or similar parts. In the drawings:

FIG. 4 shows an embodiment of the tool unit according to the invention and of the sliding support mechanism in the machining system.

PRINCIPLE UNDERLYING THE INVENTION

Figure 3:
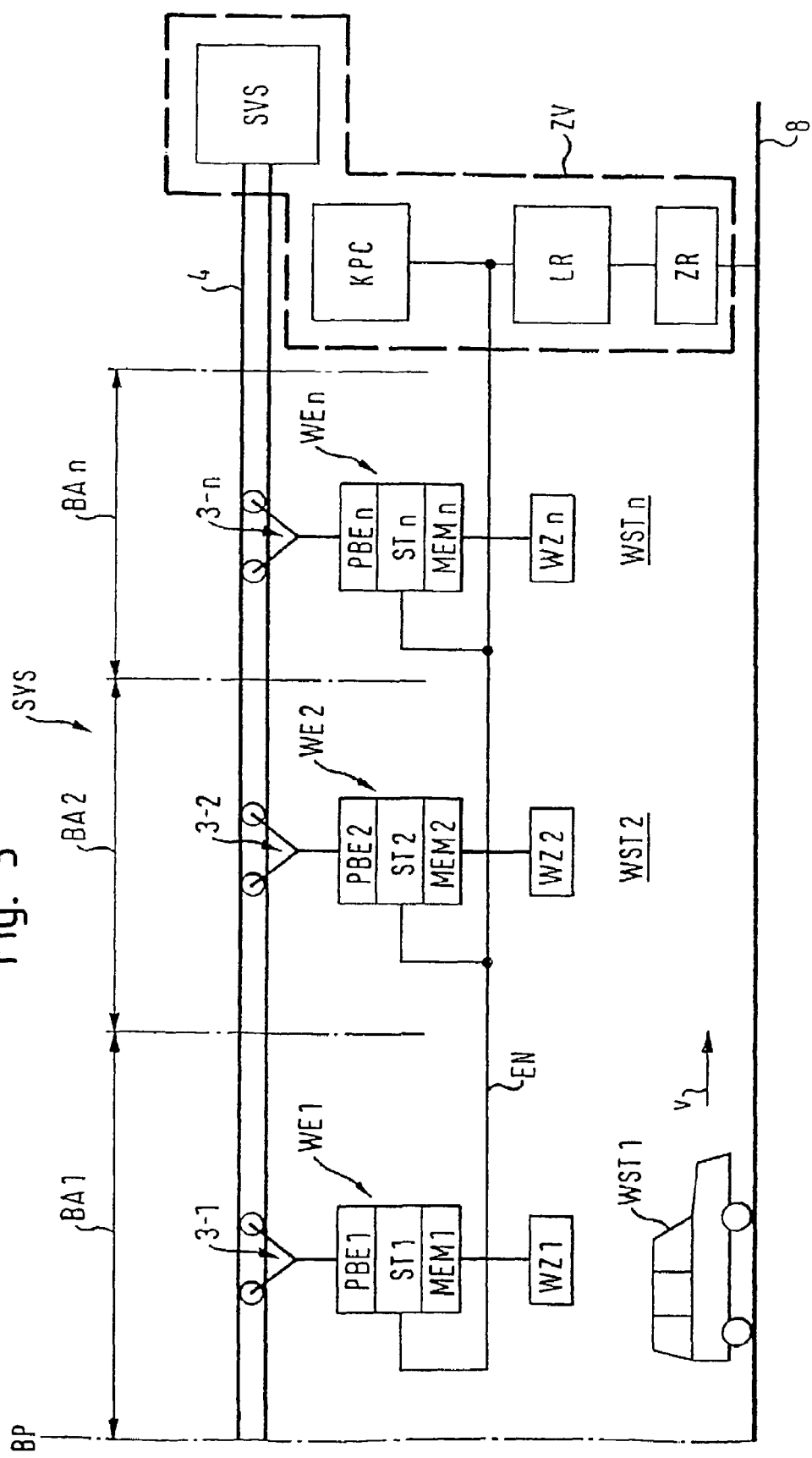
FIG. 3 shows an overview diagram of the machining system according to the invention with tool units according to the invention.

FIG. 3 shows a block diagram of the machining system SYS according to the invention. The machining system SYS is intended for the machining of workpieces WST1, in particular of workpieces WST1 located on a production line 8. It includes a large number of tool units WE1, WE2, ..., WEn and a sliding support mechanism 4.

Each tool unit WE1, WE2, ..., WEn according to the invention includes a holding unit 3-1, 3-2, ..., 3n, each of which can slide in the sliding support mechanism 4 and is held in sequence. A large number of control units ST1, ST2, ..., STn are also provided for setting the individual machining tools WZ1, WZ2, WZn to a predefined set of machining parameters in order to execute a predefined machining process. Such machining parameters are for example a specified torque for a single or multiple screwdriver, for tightening screws for example on specified parts of a car body.

As FIG. 3 shows, the machining system SYS according to the invention is also divided into individual phases or machining sections BA1, BA2, ..., BAn, whereby one or more tool units WE can be present in each machining section. A specific machining process is assigned to each machining section or to each machining tool, which can also consist of several operations, for example tightening screws on a cylinder head and fitting the cylinder head in the car body. As is customary in a production line, the workpieces WST1, e.g. car bodies, move at a predefined speed v on the production line 8.

Figure 1:
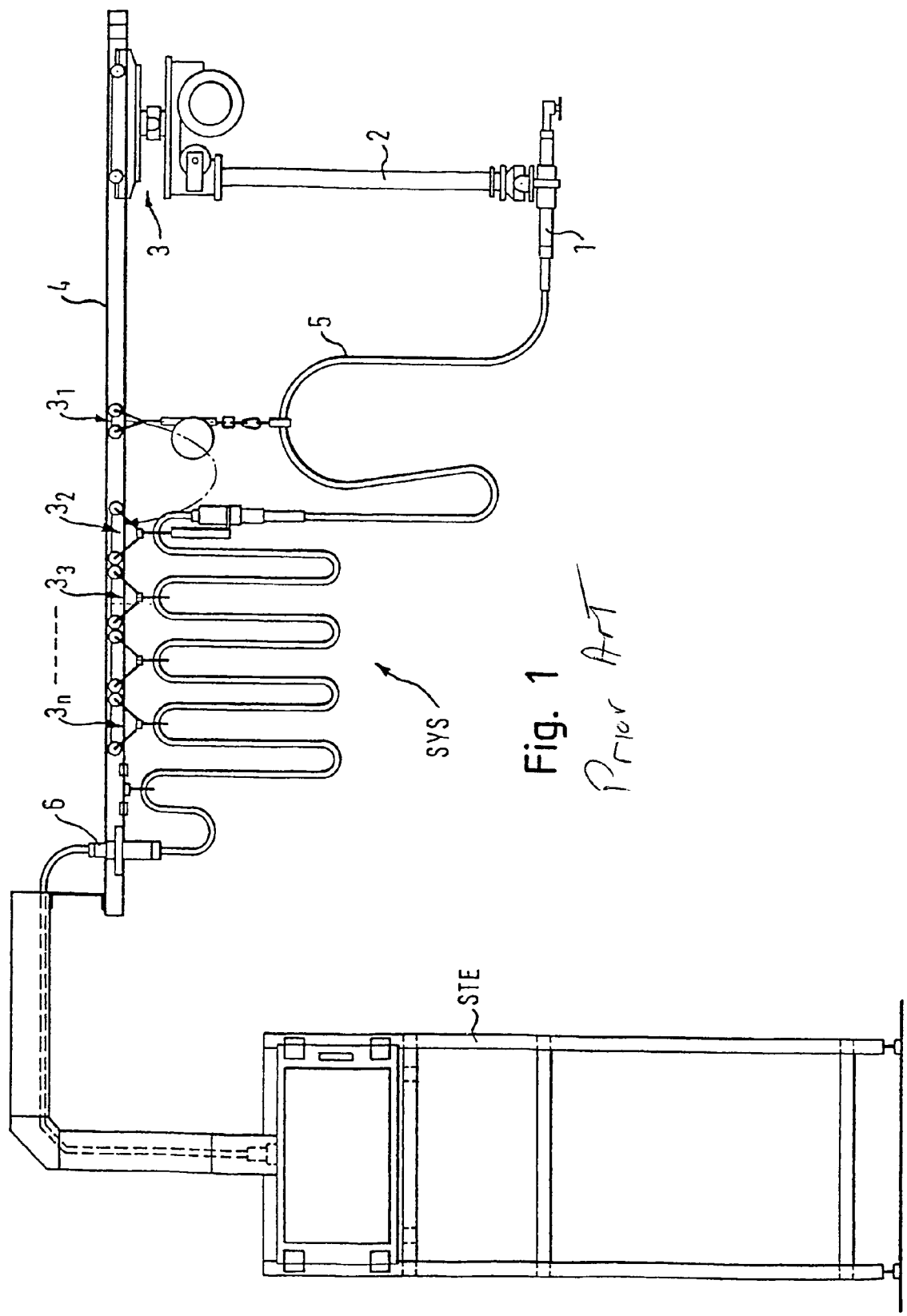
FIG. 1 shows a conventional machining system with a tool unit in a trailing cable installation.
Figure 2A:
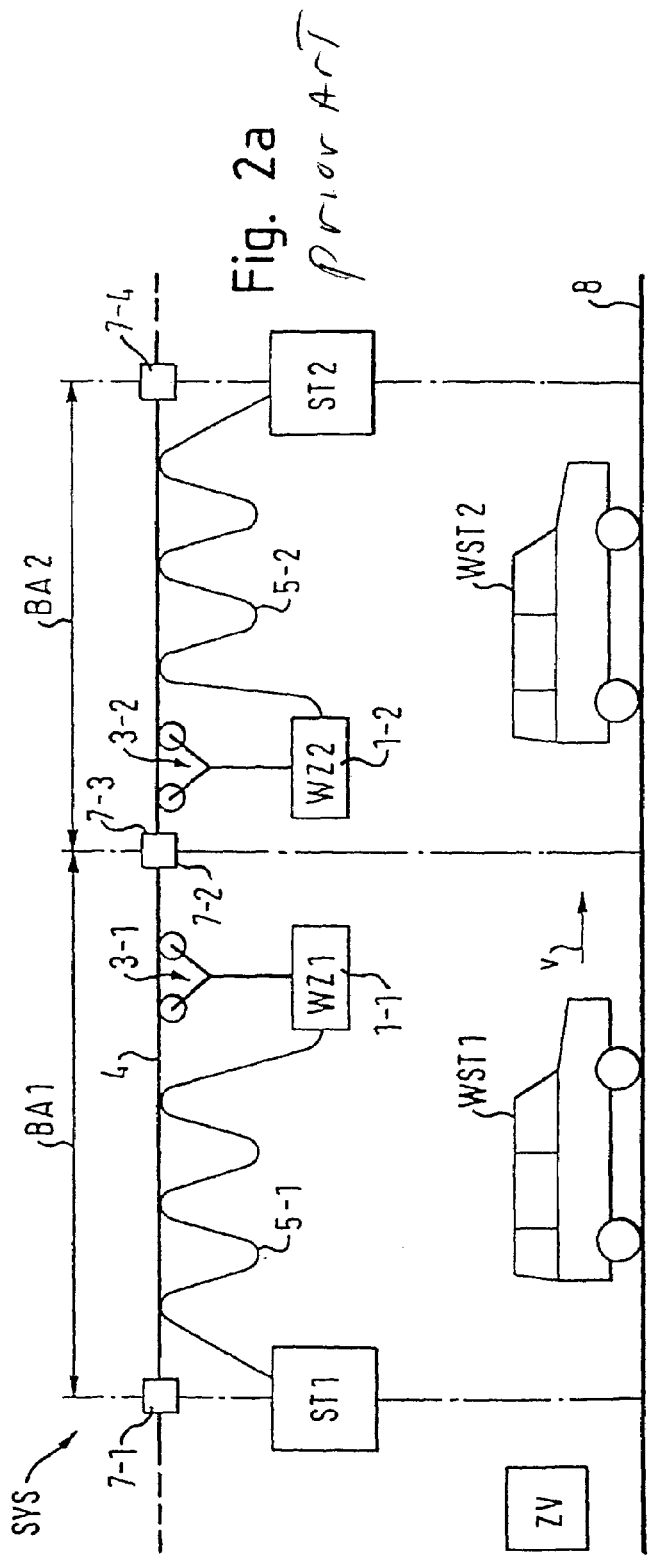
FIG. 2a shows the arrangement of several tool units in different machining sections according to the prior art.
Figure 2B:
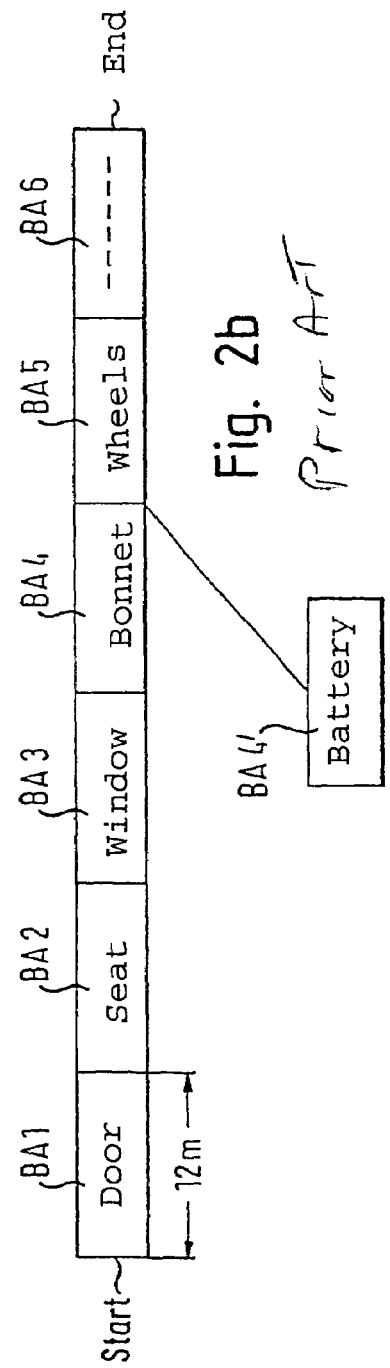
FIG. 2b shows an explanation of the rephasing and addition of additional machining steps in an assembly line.

According to the invention, in contrast to the tool unit shown in FIG. 1, the tool unit WE1, WE2, ..., WEn according to the invention includes the holding unit 3-1, 3-2, ..., 3n, a position determining unit PBE1, PBE2, ..., PBEn, which determines the position of the individual tool unit along the sliding support mechanism 4, and the control unit ST1, ST2, ..., STn itself is part of the individual tool unit. The control unit sets the individual machining tools to a particular set of machining parameters according to the position of the tool unit determined by the position determining unit. To this end a memory MEM1, MEM2, ..., MEMn is provided in the control unit ST1, ST2, ..., STn in which one or more machining parameter sets are stored. These machining parameter sets are assigned to specific position ranges of the tool unit along the sliding support mechanism 4. Such machining parameter sets can be set for example by the central processing unit ZV via a network connection EN (for example an Ethernet). Thus, if the machining sections BA1, BA2, ..., BAn are rephased for example or if the machining sections are extended, for example by the addition of a tool unit or the addition of a machining section, the central processing unit can reconfigure the machining parameter sets and/or the position ranges.

This means that the position of the tool is detected by the position determining unit and machining ranges can thus be defined with minimum/maximum limits so that the belt can be stopped or an alarm issued. For example, the tool unit also includes an alarm system in the control unit to issue an alarm if the control unit determines from the position determined by the position determining device PBE that a position range violation has occurred. However, as the position is measured independently by the individual tool unit, there is no need to provide mechanical stops on the sliding support mechanism 4.

Naturally the machining system SYS in FIG. 3 also requires a power supply system to supply power to the individual control units, in the simplest case also via a trailing cable mechanism. According to the invention the power supply system is advantageously part of the sliding support mechanism 4 and the sliding support mechanism 4 and the holding units 3-1, 3-2, ..., 3n are designed in such a way that electrical power is at least supplied to the control unit for the tool units, regardless of the position of the tool unit. This means that an electricity supply SVS is connected to the sliding support mechanism 4 or to the power supply system for the sliding support mechanism 4 and supplies power at least to the control unit ST1, ST2, STn. Depending on the voltage of the electricity supply SVS, a pulsed electricity supply or a transformer can be provided in the control units ST1, ST2, ..., STn in order to convert the power supplied (voltage) to a suitable voltage for the individual machining tool WZ1, WZ2, WZn.

It is also possible, however, to provide a central transformer in the electricity supply SVS such that a voltage can be transferred at a different level via the power supply system for the sliding support mechanism 4 such that only a pulsed electricity supply needs to be provided in the individual control units ST1, ST2, . . . , STn.

The machining tools typically operate on a DC voltage of 160 V such that in this case a voltage of only 110 V (stepped down by the transformer) is transmitted by the central electricity supply SVS via the sliding support mechanism 4 and conversion from 110 V→160 V then takes place in the individual control units.

A voltage transformer can therefore be included in the electricity supply system SVS or in the individual control units ST1, ST2, . . . , STn, whereby the inclusion of the voltage transformer in the electricity supply SVS is particularly preferred as a lower voltage can be transmitted via the sliding support mechanism 4 or its power supply system.

As can be inferred from the preceding description, the tool unit described above and the machining system with such tool units, which include a holding unit, a control unit, a position determining unit and a machining tool, achieves the object of the invention even without the special design of the power supply system. Whereas in the prior art rephasing required the individual machining units in the individual machining sections to be switched, according to the invention the individual machining units can retain their absolute position along the individual machining sections, whereby a different machining process can be executed simply by assigning new machining parameter sets. This also applies if the machining system is to be extended by one or more tool units.

If for example an additional tool unit or an additional machining step is to be introduced between BA1 and BA2, an additional tool unit simply needs to be mounted at point BP on the sliding support mechanism 4 and a new assignment of machining processes and position relations then set up. Thus the new tool unit, which is now the first on the left-hand side, assumes the function of WE1, for example, and the function of the new unit to be added is assigned to WE1.

It is naturally particularly advantageous if the power supply and data communication with the central processing system ZV is likewise provided via the sliding support mechanism 4. The machining tools can be any hand-operated single tools or multiple machining tools.

A further advantageous embodiment of the invention consists in that the central processing system ZV, which comprises a central computer ZR, a master computer LR and an interface PC KPC, is in communication with the production line 8, whereby a workpiece position determining device is provided to determine the position of the individual workpieces WST on a production line over which the sliding support mechanism 4 is provided.

The workpiece position determining device can for example include a workpiece speed detection device to detect the workpiece speed v, such that for example the arrival of the workpiece in machining zone BA1 is detected and the position of the workpiece along the conveyor system 8 can then be determined from the speed measurement. In this way it is possible to detect which machining zone BA1, BA2, . . . , BAn the individual workpieces WST1, WST2, . . . , WSTn are located and with this information the central processing system ZV can make selective process settings, i.e. a selective setting of machining parameter sets, in the individual control units such that the corresponding position relations can be specified for the individual tool units according to the moving workpiece. Process monitoring can also be maintained in this way, for example if feedback is sent from the tool units or from their control units to the central processing system via the data line EN. For example, information on process settings for the control units, quality data and workpiece parameters can also be transmitted by the central processing system ZV via the bidirectional data communication.

Other Embodiments

As described above, with the machining system SYS according to the invention with the tool units WE1, WE2, . . . , WEn according to the invention, which include holding units, a control unit with a position determining device and machining tools, it is possible to retrofit an assembly system or in the case of a new installation to work only with an integrated sliding support mechanism by adding a power supply system and a data communication system to the sliding support mechanism 4.

It is also possible to provide several tools or tool units for a machining zone, as there are no intrusive trailing cable installations. In addition, the assembly lines can easily be extended and rephased and process monitoring can be provided, since at any time it is known in which machining zone a workpiece is located, whereby the individual machining tool is preset with parameter sets that are needed for a specific machining process. Special embodiments of the various units and systems that were mentioned above are described below.

The sliding support mechanism 4 is advantageously a roller rail, whereby the holding unit 3-1, 3-2, 3-n is a travelling box or trolley suspended in the holding rail. A current conductor can be integrated into the roller rail 4 as the electricity supply system, whereby the travelling boxes include a current collecting device to take current/voltage and to supply it to the individual control unit. The integral busbar is particularly advantageous as a central transformer can be provided in the electricity supply system SVS, which means that the transformer that is present in every control unit in the prior art can be omitted.

Several embodiments are possible for the position determining unit. The position determining device can determine the relative distance to a reference point along the roller rail 4. Such a reference point BP can be the start of the roller rail 4, for example, as shown in FIG. 3. However, the position determining device can also provide relative distances to other tool units or relative distances to end points of the individual machining zones BA1, BA2, . . . , BAn.

At least a part of or the entire roller rail is preferably formed from a conductive material, for example a conductive plastic, whereby for position determination the central processing system ZV applies a given measuring voltage to the conductive part and the individual position determining devices measure the voltage drop along the busbar to determine their position (if the resistance of the busbar is known).

Alternatively a resistance measuring strip can also be integrated in the roller rail 4, whereby the position determining device determines its position from the resistance measured along the busbar 4. It is also possible for position determination to be carried out by laser distance measurement, whereby a laser distance measuring device provided in the tool unit determines a relative distance to a given reference point BP.

Furthermore, as already mentioned above, an advantageous embodiment for data communication between the central processing unit ZV and the individual control units is provided in that data communication is undertaken by an integrated data bus provided in the roller rail, whereby the travelling boxes 3-1, ..., 3-2, ..., 3n in turn include a data receiving device to receive data from the data bus and to supply it to the individual control unit. It is also possible, however, that the data processing system communicates with the individual control units via communication signals, which are modulated to the current signals present in the busbar.

The central processing system ZV can also communicate with the control units via a radio interface or an infrared interface, however. As mentioned above, such communications are undertaken in order to be able to predefine machining parameter sets and assign them to position ranges and to feed back data acquired during the machining process to the central processing system ZV.

An example of a tool unit WE is shown in FIG. 4 together with a roller rail 4. In FIG. 4 the reference number 4 indicates the roller rail, which is open underneath, whereby the holding device 3 formed from two rollers 12-1, 12-2 with an appropriate fixing device is suspended in this roller rail 4. A vertical guide is provided by the groove N and the stud S. The power supply is provide by two connectors 11, which are integrated into the roller rail 4. As shown in FIG. 4, the holding device includes a current collecting slider SAS, which is in contact with the conductors 11.

The roller rail 4 can also include a data line 10 and a distance measuring line 9 for position determination traveling box or trolley 31 also includes receiving devices for measuring the resistance of the position determining line 9, for example, and a data receiving device for receiving and supplying data signals to the data line 10.

The reference numbers 2-1, 2-2 indicate connecting rods to the control unit ST or to the tool WZ.

Other embodiments of the roller rail, for example with a U-shaped profile which is open at the top, are also possible. It is also possible to carry out position determination via a rotation sensor in the individual rollers 12-1, 12-2, provided that no slippage of the rollers occurs lengthwise along the roller rail. AS is shown with the embodiment in FIG. 4, through the arrangement of the integral conductor 11, the integral data line 10 and the integral distance measuring line 9, the machining tool WZ can be controlled with suitable parameters, power can be supplied without a trailing cable and in particular the assembly system can easily be rephrased and extended. This assembly system with no trailing cable installation is therefore described as a railnet assembly system.

INDUSTRIAL APPLICABILITY

As is explained above, with the machining system according to the invention and with the tool units according to the invention an assembly line can be flexibly and easily rephased and reconfigured. Although occasional references have been made above to automotive production lines, the present invention is not restricted to that sector but can also be used in many other applications, for example in the mass production of hi-fi products, washing machines, semiconductor assembly devices, etc., in which workpieces are machined in sections.

Many other embodiments of and improvements to the invention are therefore possible without deviating from the scope of protection as defined in the appended claims. Numerous variations and modifications can therefore be made by an average person skilled in the art on the basis of the above teaching.

Reference numbers in the claims are for illustrative purposes only and do not restrict the scope of protection of the claims.

The invention claimed is:

1. Machining system for the machining of workpieces, in particular of workpieces located on a production line comprising:
    a) a large number of tool units, each with an electrically controllable machining tool and a holding unit;
    b) a sliding support mechanism in which the holding units are held in sequence, whereby the holding units are held in the sliding support mechanism in such a way that they can slide; and
    c) a large number of control units for setting an individual machining tool to a set of predefined machining parameters in order to execute a predefined machining process;
    characterized in that
    d) each tool unit includes a position determining unit, which determines the position of the individual tool unit along the sliding support mechanism;
    e) the control unit is part of the tool unit; and the control unit sets the individual machining tool to a particular set of machining parameters according to the position of the tool unit determined by the position determining unit.

2. Machining system according to claim 1,
characterized in that
a large number of machining parameter sets, each assigned to specific position ranges of the tool unit, are stored in the control units for the individual tool units.

3. Machining system according to claim 2,
characterized in that
when a new tool unit is added to the sliding support mechanism, the central processing unit reconfigures the machining parameter sets and/or the position ranges.

4. Machining system according to claim 1,
characterized in that
a central processing unit is provided, which sets the machining parameter sets in the individual control units.

5. Machining system according to claim 4,
characterized in that
the central processing system together with the individual control unit carries out settings via a radio or infrared interface.

6. Machining system according to claim 1,
characterized in that
a power supply system is provided to supply power to the control units, whereby the power supply system is part of the sliding support mechanism and the sliding support mechanism and the holding units are designed in such a way that electrical power is at least supplied to the control unit for the tool units, regardless of the position of the tool unit.

7. Machining system according to claim 1,
characterized in that
the sliding support mechanism is a roller rail and the holding unit is a traveling box suspended in the holding rail.

8. Machining system according to claim 7, characterized in that
a current conductor is integrated into the roller rail and the traveling boxes include a current collecting device to take current and supply it to the individual control unit.

9. Machining system according to claim 7,
characterized in that the central processing system together with the individual control units sets the machining parameter sets by means of an integral data bus provided in the roller rail, whereby the traveling box includes a data receiving device to receive data from the data bus and to supply it to the individual control unit.

10. Machining system according to claim 7, characterized in that
the central processing system together with the individual control units communicates via communication signals, which are modulated to the busbar.

11. Machining system according to claim 7, characterized in that
the machining tool is a hand-operated single tool or a multiple machining tool.

12. Machining system according to claim 1, characterized in that
the position determining device determines the relative distance to a reference point along the sliding support mechanism.

13. Machining system according to claim 12, characterized in that
at least a part of the roller rail is formed from a conductive material, the central processing system applies a preset measuring voltage to the conductive part and the position determining device measures the voltage drop along the busbar in order to determine the position.

14. Machining system according to claim 12, characterized in that
a resistance measuring strip is integrated into the roller rail and the position measuring device measures the resistance along the busbar in order to determine the position.

15. Machining system according to claim 12, characterized in that
the position determining device performs a laser distance measurement to the reference point in order to determine the position.

16. Machining system according to claim 1, characterized in that
a workpiece position determining device is provided to determine the position of the individual workpieces on a production line above which the sliding support mechanism is provided.

17. Machining system according to claim 1, characterized in that
the workpiece position determining device includes a workpiece speed detection device.

18. Machining system according to claim 1, characterized in that
the central processing system supplies a predefined power to the power supply system.

19. Machining system according to claim 18, characterized in that
the central processing includes system includes a voltage transformer.

20. Machining system according to claim 18, characterized in that
each tool unit includes a voltage transformer.

21. Machining system according to claim 1, characterized in that
an alarm system is provided in the control unit to issue an alarm if the control unit determines from the position determined by the position determining device that a position range violation has occurred.

22. Tool unit in a machining system for the machining of workpieces, in particular of workpieces located on a production line, comprising:
a) an electrically controllable machining tool; and
b) a holding unit to be held in a sliding support mechanism in the machining system (SYS);
characterized in that
c) a control unit is provided for setting the machining tool to a set of predefined machining parameters in order to execute a predefined machining process;
d) each tool unit includes a position determining unit, which determines the position of the individual tool unit along the sliding support mechanism; and
e) the control unit sets the individual machining tool to a particular set of machining parameters according to the position of the tool unit determined by the position determining unit.

23. Tool unit according to claim 22, characterized in that
a large number of machining parameter sets, each assigned to specific position ranges of the tool unit, are stored in the control unit.

24. Tool unit according to claim 22, characterized in that
the holding unit is a suspended traveling box.

25. Tool unit according to claim 23, characterized in that
the traveling box includes a current collecting device.

26. Tool unit according to claim 22, characterized in that
the position determining device determines the relative distance to a reference point along the sliding support mechanism.

27. Tool unit according to claim 22, characterized in that
the position determining device measures the voltage drop or the resistance along a busbar in order to determine the position.

28. Tool unit according to claim 22, characterized in that
the position determining device performs a laser distance measurement in order to determine the position.

29. Tool unit according to claim 22, characterized in that
the machining tool is a hand-operated single tool or a multiple machining tool.

30. Tool unit according to claim 22, characterized in that
an alarm system is provided in the control unit to issue an alarm if the control unit determines from the position determined by the position determining device that a position range violation has occurred.

* * * * *